Aug. 8, 1933.  D. L. FARMER ET AL  1,921,288
CABLE REEL FOR ELECTRIC APPLIANCES
Filed Aug. 28, 1931  2 Sheets-Sheet 1

Inventors
Dora L. Farmer
Thomas B. Farmer
By
Clive Hartson
Attorney

Aug. 8, 1933.   D. L. FARMER ET AL   1,921,288
CABLE REEL FOR ELECTRIC APPLIANCES
Filed Aug. 28, 1931   2 Sheets-Sheet 2
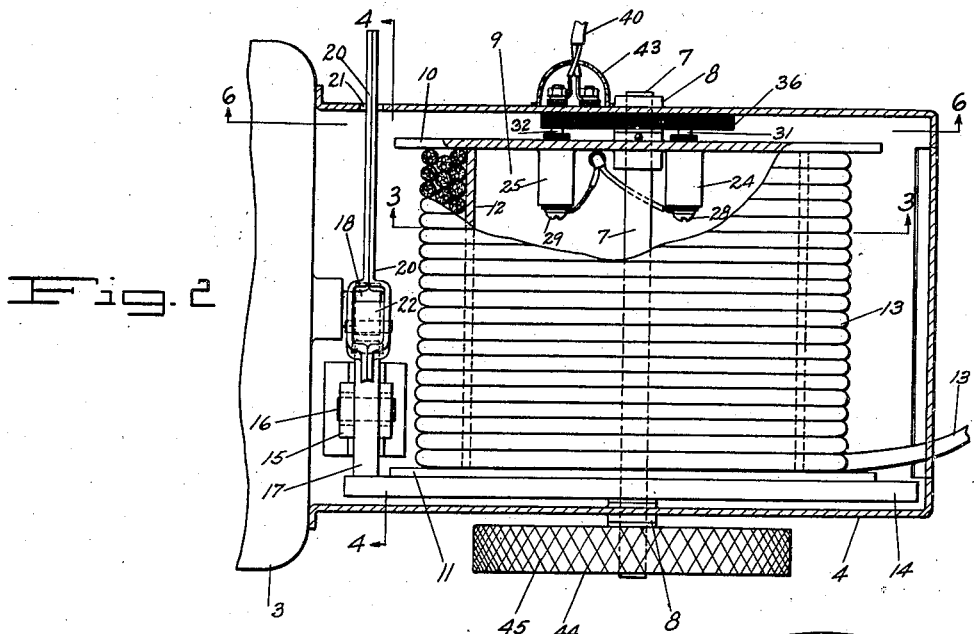
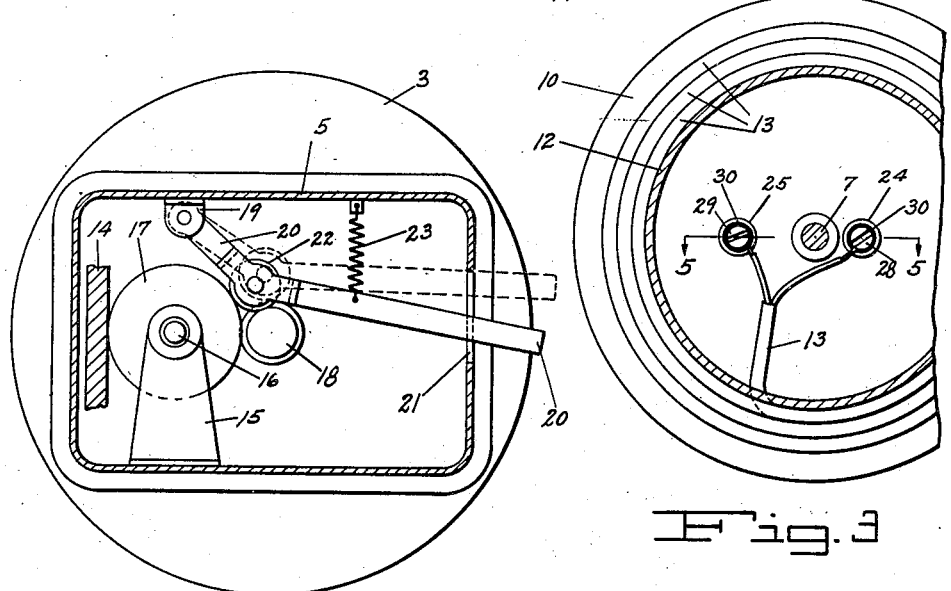
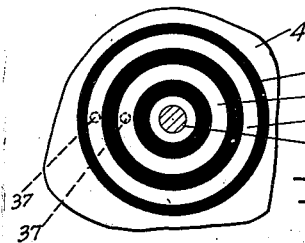
Inventors
Dora L. Farmer
Thomas B. Farmer
By Clive Hartson
Attorney Patented Aug. 8, 1933

1,921,288

UNITED STATES PATENT OFFICE 1,921,288

CABLE REEL FOR ELECTRIC APPLIANCES

Dora L. Farmer and Thomas B. Farmer,
Portland, Oreg.

Application August 28, 1931. Serial No. 559,924

1 Claim. (Cl. 242—77)

The object of the present invention is to provide a convenient means for carrying cable used in connection with electrically operated vacuum cleaners for making connection between the motor of such device and a source of electric current supply.

Another object is to provide a device for the purposes aforesaid which is in the nature of a reel upon which such cable is carried.

Another object is to provide a reel for carrying the cable which has embodied in it construction which will permit electric energy to travel through the cable to the motor regardless of whatever proportion of the total length of such cable may be wound upon such reel.

Another object is to mount such reel to the casing of the motor operating such appliance so that not only will it be in position least likely to interfere with the operation of such appliance, but it will likewise be in position to derive power from the motor for its own operation.

Another object is to provide simple and efficient means for utilizing the power of the appliance motor for operating such reel.

Other and additional objects of this invention will appear upon reading the specification which follows, aided by the accompanying drawings, wherein:

Figure 2 is the horizontal section view indicated by the section lines 2—2 of Figure 1;

Figure 3 is the vertical section view indicated by section line 3—3 of Figure 2;

Figure 4 is the vertical section view indicated by section line 4—4 of Figure 2;

Figure 6 is the vertical section view indicated by section line 6—6 of Figure 2.

Similar numbers indicate similar parts throughout the several views.

Figure 5:
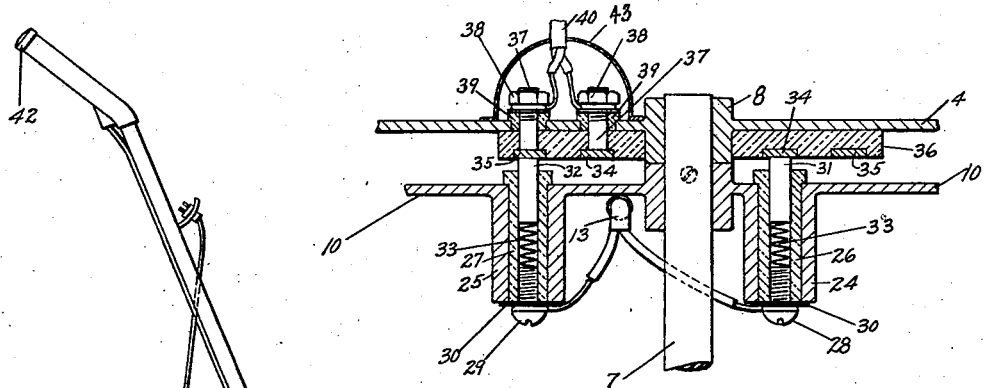
Figure 5 is the horizontal section view indicated by section line 5—5 or Figure 3.
Figure 1:
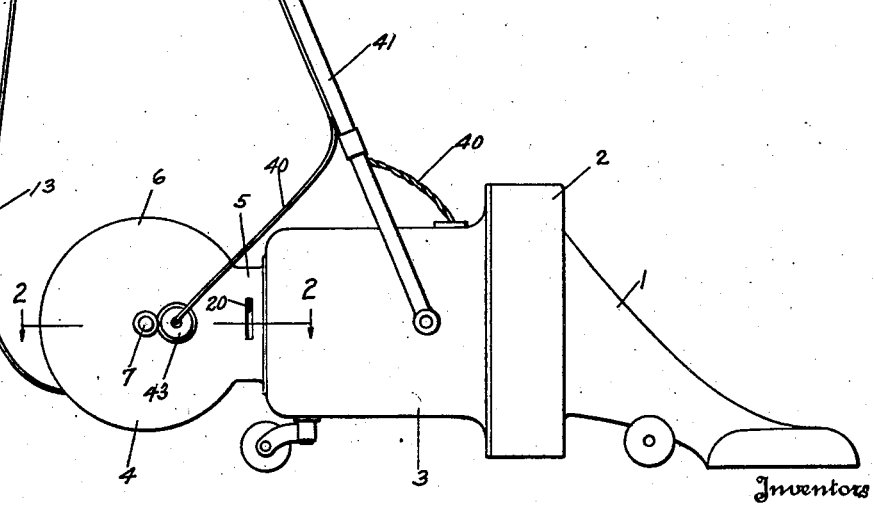
Figure 1 is a side elevation of a vacuum cleaner having the present invention embodied therein.

The drawings disclose this invention as being used in conjunction with a horizontal motor type of vacuum cleaner as shown in Figure 1, wherein 1 is the suction nozzle, 2 the fan casing, 3 the motor housing and 4 a casing for a cable reel. As will be seen, the reel casing is attached to the rear of the motor housing and largely constitutes a continuation thereof. With the exception of the rectangular neck portion 5 joining the motor housing, the greater body portion 6 of the reel casing has been given a cylindrical form in order to conform to the outline of a cable reel which it houses.

A shaft 7 is arranged transversely of casing 3 for rotation in bearings 8 which are included in the walls of such casing. A cable holding reel 9 is secured to shaft 7, and in particular it embodies in its construction the two sides 10 and 11 and the cylindrical bed 12 upon which the appliance cable 13 is carried.

Secured to the outer face of the side 11 of the reel is a friction disk 14, which is somewhat more extensive than the side 11, so that its perimeter extends beyond the perimeter of such side. An upright support or standard 15 is mounted within neck portion 5 of the reel casing and is provided with a suitable bearing 16 for carrying the rotatable disk 17. Disk 17 frictionally engages disk 14, and when it itself is driven, drives such disk 14 and consequently reel 9. Disk 17 is arranged axially parallel to shaft 18, though spaced somewhat therefrom, shaft 18 being the shaft of the motor operating the cleaner. A downwardly projecting lug 19 is provided in the upper wall of neck 5. To this lug is pivotally secured one end of the lever 20, the other end of which projects through the slot 21 in the side wall of the neck 5. Lever 20 carries a freely rotatable friction disk 22 which is so situated, by reason of the position of the lever 20, that when lever 20 is depressed it engages both disk 17 and shaft 18, which last is made to project somewhat for this purpose, thereby transmitting rotation from such shaft to disk 17 and ultimately to reel 9. However, disk 22, as shown by the dash outline, is normally in a neutral position out of engagement with the shaft 18 and disk 17 by reason of the fact that the lever 20 is supported by a spring 23 secured between the top of the neck 5 and such lever, and in order to transmit rotation from shaft 18 to reel 9 it is necessary to depress the end of lever 20 which projects through slot 21. This may be easily done by placing the foot thereon. Upon release, lever 20 allows disk 22 to return to neutral position, thereby disconnecting power transmission to reel 9 which will thereupon cease rotating.

In order to enable cable 13 to supply electric energy to the motor of the vacuum cleaner a suitable connection must be made for that purpose, so that, regardless of the amount of cable carried upon the reel, or whether the cable is being wound or unwound, energy can always be supplied the motor. The construction outlined hereafter will describe how this has been done.

The inner face of side 10 of reel 9 is provided with a pair of sleeves 24 and 25 having unequal spacing with regard to shaft 7, so that as the reel is rotated the orbit of sleeve 25 is outside of or surrounding that of 24. Sleeves 24 and 25 are supplied with interiorally positioned insulative bushings 26 and 27 respectively, which are held in position by their respective screws 28 and 29 and insulative washers 30. Bushings 26 and 27 are apertured lengthwise to receive the commutator pins 31 and 32 respectively. These pins rest upon springs 33, one in each bushing, which urge them outwardly so that their outer ends bear upon rings 34 and 35, which are seated in an insulative plate 36 secured to a side wall of the reel casing. The two rings are concentrically arranged so that pin 31 constantly engages ring 34, and pin 32 constantly engages ring 35.

Rings 34 and 35, as well as plate 36, are held against movement upon the casing wall by the threaded pins 37, one for each ring. These pins extend through plate 36 and bushings 39 insulating them from the wall of the reel casing, and are secured by the nuts 38. One end of cable 13, wound on reel 9, passes through an aperture provided therefor in bed 12 thereby enabling one of the leads thereof to be connected to screw 28 and the other to screw 29. This provides a circuit connection from such cable, through screws 28 and 29, springs 27, commutator pins 31 and 32, rings 34 and 35, and pins 37. To the pins 37 are attached the two leads of the cable 40, one lead to each pin. This completes the circuit from cable 13 to cable 40, which passes along the cleaner handle 41, through control switch 42 and on to the motor. Where the two leads of cable 40 connect with pins 37 a protective housing 43 is provided to prevent shorts or shocks.

The present invention will be found useful in connection with cleaners using a supply cable of considerable length as it affords a ready means for taking care of it. When a considerable length of cable has been let out, and it is desired to reel in some, all that is necessary is to place the foot on lever 20 thereby throwing into operation the friction gearing and causing the reel to operate. When the required amount has been reeled in the foot lever is released. In some instances it may be found desirable to manually operate the reel and for this purpose shaft 7 has mounted thereon a wheel 44 provided with a roughened face 45 to enable it to be rotated by hand or foot.

We claim:—

An electric cable holder for portable electric appliances and tools employing an electric motor as a driving means, including a housing for such motor, a casing secured to said housing, a cable reel rotatable about an horizontal axis housed in said casing, a friction disk secured to and rotatable with said reel, a rotatable disk frictionally engaging the first mentioned disk, the last mentioned disk being arranged in axial parallelity to and spaced from the drive shaft of the aforesaid motor, a lever designed for vertical movement pivotally suspended above the last mentioned disk and shaft, a rotatable disk carried by said lever and adapted when said lever is lowered to engage the second disk and said shaft simultaneously for the purpose of transmitting rotation from said shaft through the second and first mentioned disks to said reel.

DORA L. FARMER.
THOMAS B. FARMER.